US012689999B2

(12) United States Patent
Fakoorian et al.

(10) Patent No.: US 12,689,999 B2
(45) Date of Patent: Jul. 21, 2026

(54) TIMING ADVANCE TECHNIQUES TO MANAGE CROSS LINK INTERFERENCE IN 5G COMMUNICATION SYSTEMS

(71) Applicant: Apple Inc., Cupertino, CA (US)

(72) Inventors: Seyed Ali Akbar Fakoorian, San Diego, CA (US); Haitong Sun, Cupetino, CA (US); Hong He, San Jose, CA (US); Wei Zeng, Saratoga, CA (US); Chunxuan Ye, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 18/225,995

(22) Filed: Jul. 25, 2023

(65) Prior Publication Data

US 2024/0155525 A1 May 9, 2024

Related U.S. Application Data

(60) Provisional application No. 63/422,247, filed on Nov. 3, 2022.

(51) Int. Cl.
*H04W 56/00* (2009.01)
*H04L 5/14* (2006.01)

(52) U.S. Cl.
CPC ....... *H04W 56/0045* (2013.01); *H04L 5/1469* (2013.01)

(58) Field of Classification Search
CPC .......................... H04W 56/0045; H04L 5/1469
See application file for complete search history.

(56) References Cited

U.S. PATENT DOCUMENTS

2018/0279334 A1* 9/2018 Lim ................... H04L 27/2607
2021/0250797 A1 8/2021 Karjalainen et al.
(Continued)

FOREIGN PATENT DOCUMENTS

WO 2020144624 A1 7/2020
WO WO 2020143027 A1 7/2020
(Continued)

OTHER PUBLICATIONS

International Search Report and Written Opinion directed to related International Application No. PCT/US2023/078352, mailed Feb. 20, 2024; 13 pages.
(Continued)

*Primary Examiner* — Ayman A Abaza
*Assistant Examiner* — Benjamin T. Ranew
(74) *Attorney, Agent, or Firm* — Sterne, Kessler, Goldstein & Fox P.L.L.C.

(57) ABSTRACT

Systems, methods, and apparatuses disclosed herein can mitigate interference in a wireless network. These systems, methods, and apparatuses can identify a mode of operation of a base station (BS) and can select a time advance (TA) that is associated with the identified mode of operation. These systems, methods, and apparatuses can advance signals on an uplink (UL) by the TA to cause the signals on the UL to be time aligned with other signals from other UEs on the UL at the BS to mitigate inter carrier interference (ICI) at the BS. Otherwise, these systems, methods, and apparatuses can advance the signals on the UL by the TA to cause the signals on the UL to be time aligned with signals from the BS on the DL at a victim UE within the wireless network to mitigate cross link interference (CLI) at the victim UE.

20 Claims, 8 Drawing Sheets

(56) References Cited

U.S. PATENT DOCUMENTS

| | | |
|---|---|---|
| 2021/0289374 A1 | 9/2021 | Zhang et al. |
| 2022/0077999 A1 | 3/2022 | Babaei et al. |
| 2022/0116129 A1 | 4/2022 | Ying et al. |

FOREIGN PATENT DOCUMENTS

| | | |
|---|---|---|
| WO | 2020164063 A1 | 8/2020 |
| WO | 2022021362 A1 | 2/2022 |
| WO | 2022036625 A1 | 2/2022 |
| WO | 2022055816 A1 | 3/2022 |
| WO | 2022056819 A1 | 3/2022 |
| WO | 2022250511 A1 | 12/2022 |

OTHER PUBLICATIONS

International Search Report and Written Opinion directed to related International Application No. PCT/US2023/075788, mailed Feb. 12, 2024; 12 pages.

International Search Report and Written Opinion directed to International Application No. PCT/US2023/078354, mailed Feb. 28, 2024; 9 pages.

ZTE, "Discussion of subband non-overlapping full duplex," 3GPP TSG RAN WG1 #110bis-e, e-Meeting, Oct. 10-19, 2022, R1-2208484; 14 pages.

* cited by examiner

320

IDENTIFY MODE OF
OPERATION OF BASE
STATION                                    322

SELECT TIME ADVANCE
THAT IS ASSOCIATED
WITH MODE OF
OPERATION                                  324

ADVANCE TIMING OF A DL
IN ACCORDANCE WITH
THE SELECTED TIME
ADVANCE                                    326

PROVIDE SIGNALS ON THE
TIME ADVANCED DL TO
THE UE                                     328

TIMING ADVANCE TECHNIQUES TO MANAGE CROSS LINK INTERFERENCE IN 5G COMMUNICATION SYSTEMS

CROSS-REFERENCE TO RELATED APPLICATIONS

The present application claims the benefit of U.S. Provisional Patent Application No. 63/422,247, filed Nov. 3, 2022, which is incorporated herein by reference in its entirety.

BACKGROUND

A wireless network, for example, one compliant with 3rd Generation Partnership Project (3GPP) standards, can include many electronic devices, such as a first user equipment (UE) and a first base station (BS). The first BS can transmit on a downlink (DL) to the first UE and the first UE can transmit on an uplink (UL) to the first BS. In some situations, the wireless network can include a second UE that is transmitting on the UL to the first BS while the first UE is receiving on the DL which may cause cross link interference (CLI) between the first UE and the second UE. In other situations, the wireless network can include a second BS that is transmitting on the DL while the first BS is receiving on the UL which may cause the CLI between the first BS and the second BS. Because of the large transmit power discrepancy between UL and DL, and/or propagation conditions, the CLI can be detrimental to performance of the wireless network.

SUMMARY OF DISCLOSURE

Some embodiments of this disclosure describe a method for mitigating cross link interference (CLI) in a wireless network. The method includes identifying a mode of operation of a base station (BS) within the wireless network; selecting a time advance (TA) that is associated with the mode of operation from among a plurality of TAs that are stored in the first UE, advancing timing of an uplink (UL) by the selected time advance, and transmitting signals on the time advanced UL to the BS.

In some embodiments, the mode of operation can include a static time division duplex (TDD) mode of operation; a sub-band full duplex (SBFD) mode of operation; or a dynamic TDD mode of operation. In these embodiments, the selecting can include selecting a first TA based on the BS operating in the static TDD mode of operation and the advancing can include advancing timing of the UL by the first TA to cause the signals on the time advanced UL to be time aligned with other signals from other UEs received at the BS. In these embodiments, the selecting can include selecting a second TA based on the BS operating in the SBFD mode of operation or the dynamic TDD mode of operation and the advancing can include advancing timing of the UL by the second TA to cause the signals on the time advanced UL to be time aligned with signals on a downlink (DL) from the BS at a second UE within the wireless network.

In some embodiments, the advancing can include advancing timing of an UL frame by the selected time advance.

In some embodiments, the method can further include receiving TAs from the BS on Layer 1 signaling. In these embodiments, the Layer 1 signaling can include Uplink Control Information (UCI).

In some embodiments, the method can further include receiving TAs from the BS on Layer 2 signaling. In these embodiments, the Layer 2 signaling can include a Random Access Response (RAR) having TA information or a Media Access Control-Control Element (MAC-CE).

Some embodiments of this disclosure describe a first user equipment (UE) that includes a processor and a transceiver. The processor identifies a mode of operation of a base station (BS) within a wireless network, selects a time advance (TA) that is associated with the mode of operation from among a plurality of TAs that are stored in the first UE, and advances timing of an uplink (UL) by the selected time advance. The transceiver transmits signals on the time advanced UL to the BS.

In some embodiments, the mode of operation can include a static time division duplex (TDD) mode of operation; a sub-band full duplex (SBFD) mode of operation; or a dynamic TDD mode of operation. In these embodiments, the processor can select a first TA when the BS is operating in the static TDD mode of operation and advance timing of the UL by the first TA to cause the signals on the time advanced UL to be time aligned with other signals from other UEs received at the BS. In these embodiments, the processor can select a second TA when the BS is operating in the SBFD mode of operation or the dynamic TDD mode of operation and advance timing of the UL by the second TA to cause the signals on the time advanced UL to be time aligned with signals on a downlink (DL) from the BS at a second UE within the wireless network.

In some embodiments, the processor can advance timing of an UL frame by the selected time advance.

In some embodiments, the processor can receive TAs from the BS on Layer 1 signaling. In these embodiments, the Layer 1 signaling can include Uplink Control Information (UCI).

In some embodiments, the processor can receive TAs from the BS on Layer 2 signaling. In these embodiments, the Layer 2 signaling can include a Random Access Response (RAR) having TA information or a Media Access Control-Control Element (MAC-CE).

Some embodiments of this disclosure describe a first user equipment (UE) that includes a memory and a processor. The memory stores a first time advance (TA) and a second TA. The processor selects the first TA in response to a BS within a wireless network operating in a sub-band full duplex (SBFD) mode of operation or a dynamic time division duplex (TDD) mode of operation, advances timing of an uplink (UL) by the first TA to cause signals on the time advanced UL to be time aligned with signals on a downlink (DL) from the BS at a second UE within the wireless network, and transmits the signals on the time advanced UL to the base station.

In some embodiments, the processor is can select the second TA in response to the BS operating in a static TDD mode of operation and advance timing of the UL by the second TA to cause the signals on the time advanced UL to be time aligned with other signals from other UEs received at the BS.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1A:
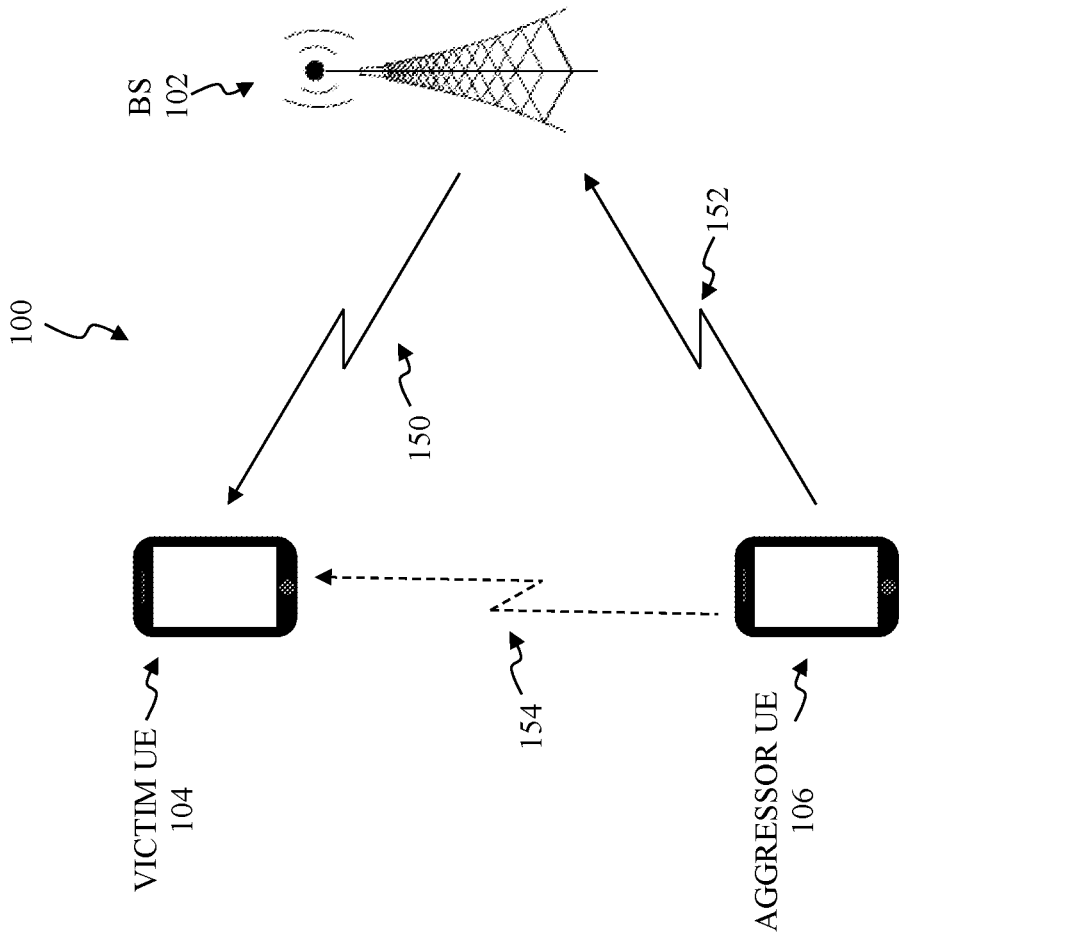
FIG. 1A and FIG. 1B graphically illustrate exemplary wireless networks having cross link interference (CLI) in accordance with various embodiments of the present disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Systems, methods, and apparatuses disclosed herein can mitigate interference in a wireless network. These systems, methods, and apparatuses can determine a mode of operation of a base station (BS) within the wireless network. These systems, methods, and apparatuses can select a first time advance (TA) when the BS is operating in a static time division duplex (TDD) mode of operation or a second TA when the BS is operating in a sub-band full duplex (SBFD) mode of operation or a dynamic TDD mode of operation. These systems, methods, and apparatuses can advance signals on an uplink (UL) by the first TA to cause the signals on the UL to be time aligned with other signals from other UEs on the UL at the BS to mitigate inter carrier interference (ICI) at the BS. Otherwise, these systems, methods, and apparatuses can advance the signals on the UL by the second TA to cause the signals on the UL to be time aligned with signals from the BS on the DL at a victim UE within the wireless network to mitigate cross link interference (CLI) at the victim UE.

Exemplary Wireless Networks Having Cross Link Interference (CLI)

Figure 1B:
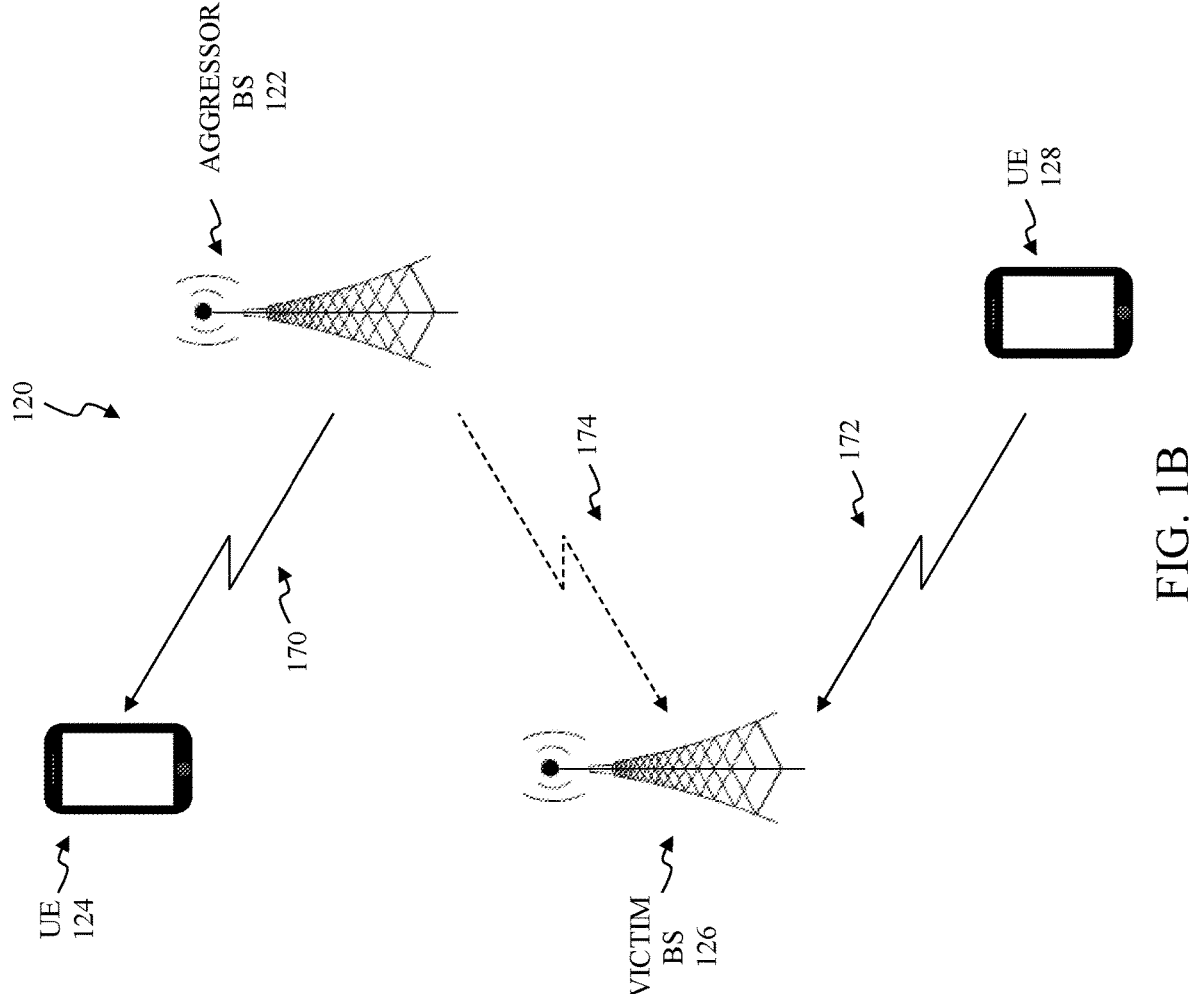

FIG. 1A and FIG. 1B graphically illustrate exemplary wireless networks having cross link interference (CLI) in accordance with various embodiments of the present disclosure. In the exemplary embodiment illustrated in FIG. 1A, a first wireless network 100 includes a base station (BS) 102, a victim user equipment (UE) 104, and an aggressor UE 106. As illustrated in FIG. 1A, the BS 102 can transmit signals on a downlink (DL) 150 to the victim UE 104. As used herein, the terms downlink, DL, or the like refer to a first direction from a BS, such as the BS 102 to provide an example, to a UE, such as the victim UE 104 to provide an example. The DL 150 can include one or more downlink communication channels, for example, a Physical Downlink Control Channel (PDCCH) and/or a Physical Downlink Shared Channel (PDSCH). And as illustrated in FIG. 1A, the BS 102 receive signals on an uplink (UL) 152 from the aggressor UE 106. As used herein, the terms UL, or the like refers to a second direction from a UE, such as the aggressor UE 106 to provide an example, to a BS, such as the BS 102 to provide an example. The UL 152 can include one or more uplink communication channels, for example, a Physical Uplink Control Channel (PUCCH) and/or a Physical Uplink Shared Channel (PUSCH). In some embodiments, the aggressor UE 106 can transmit on the UL 152 while the victim UE 104 is receiving on the DL 150 which may cause CLI 154 in the first wireless network 120 between the victim UE 104 and the aggressor UE 106.

As illustrated in FIG. 1B, a second wireless network 120 includes an aggressor BS 122, a first UE 124, a victim BS 126, and a second UE 128. As illustrated in FIG. 1B, the aggressor BS 122 can transmit on a DL 170 to the first UE 124. The DL 170 can include one or more downlink communication channels, for example, the PDCCH and/or the PDSCH. And as illustrated in FIG. 1B, the victim BS 126 can receive on a UL 172 from the second UE 128. The UL 172 can include one or more uplink communication channels, for example, the PUCCH and/or the PUSCH. In some embodiments, the aggressor BS 122 can transmit on the DL 170 while the victim BS 126 is receiving on the UL 172 which may cause CLI 174 in the second wireless network 120 between the aggressor BS 122 and the victim BS 126.

The first wireless network 100 and the second wireless network 120 can be configured to operate based on a wide variety of wireless communication techniques. These techniques can include, but are not limited to, techniques based on 3rd Generation Partnership Project (3GPP) standards. In some embodiments, the BS 102, the aggressor BS 122, and/or the victim BS 126 can include one or more Next Generation Node BSs (gNBs), one or more radio access nodes (RANs), one or more evolved NodeBs (eNBs), one or more NodeBs, one or more Road Side Units (RSUs), one or more Transmission Reception Points (TRxPs or TRPs), and/or the like. In these embodiments, the BS 102, the aggressor BS 122, and/or the victim BS 126 can include one or more nodes configured to operate based on a wide variety of wireless communication techniques such as, but not limited to, techniques based on 3GPP standards. For example, the BS 102, the aggressor BS 122, and/or the victim BS 126 can include one or more nodes configured to operate using Rel-15, Rel-16, Rel-17, or others.

And, in some embodiments, the victim UE 104, the aggressor UE 106, the first UE 124, and/or the second UE

128 can include one or more consumer electronics devices, one or more cellular phones, one or more smartphones, one or more feature phones, one or more tablet computers, one or more wearable computer devices, one or more personal digital assistants (PDAs), one or more pagers, one or more wireless handsets, one or more desktop computers, one or more laptop computers, one or more in-vehicle infotainments (IVIs), one or more in-car entertainment (ICEs) devices, one or more Instrument Clusters (ICs), one or more head-up display (HUD) devices, one or more onboard diagnostic (OBD) devices, one or more dashtop mobile equipments (DMEs), one or more mobile data terminals (MDTs), one or more Electronic Engine Management Systems (EE-MSs), one or more electronic/engine control units (ECUs), one or more electronic/engine control modules (ECMs), one or more embedded systems, one or more microcontrollers, one or more control modules, one or more engine management systems (EMSs), one or more networked or "smart" appliances, one or more Machine-Type-Communication (MTC) devices, one or more Machine-to-Machine (M2M) devices, one or more Internet of Things (IoT) devices, and the like. In these embodiments, the victim UE 104, the aggressor UE 106, the first UE 124, and/or the second UE 124 can be configured to operate based on a wide variety of wireless communication techniques such as, but not limited to, techniques based on 3GPP standards. For example, the victim UE 104, the aggressor UE 106, the first UE 124, and/or the second UE 124 can be configured to operate using Rel-15, Rel-16, Rel-17, or others.

Exemplary Time Advances that can be Implemented in the Exemplary Wireless Networks to Mitigate CLI The discussion to follow is to describe exemplary time advances that can be utilized to mitigate CLI within the wireless network 100 as described above in FIG. 1A. However, these exemplary time advances are equally applicable to the wireless network 120 as illustrated in FIG. 1B as will be recognized by those skilled in the relevant art(s) without departing from the spirit and scope of the present disclosure. Because of the large transmit power discrepancy between the DL 170 and the UL 172 and/or propagation conditions, the CLI can be detrimental to performance of the first wireless network 100. In the exemplary embodiment illustrated in FIG. 1A, the aggressor UE 106 can transmit signals on the UL 152 to the BS 102 while the victim UE 104 is receiving signals on the DL 150 from the BS 102 which may cause the CLI 154 in the first wireless network 100 between the victim UE 104 and the aggressor UE 106. As to be described in further detail below, the aggressor UE 106 can select between a first UE time advance $TA_{UE.1}$ or a second UE time advance $TA_{UE.2}$ based upon a mode of operation of the BS 102. And as to be described in further detail below, the aggressor UE 106 can select the first UE time advance $TA_{UE.1}$ to advance the signals on the UL 152 by the first UE time advance $TA_{UE.1}$ to cause the signals on the UL 152 to be time aligned with other signals from other UEs at the BS 102 when the BS 102 is operating in a static time division duplex (TDD) mode of operation. The first UE time advance $TA_{UE.1}$ represents an advancement in the timing of the UL frame such that the UL 152 is aligned with the other signals from the other UEs at the BS 102. Alternatively, or in addition to, the aggressor UE 106 can select the second UE time advance $TA_{UE.2}$ to advance the signals on the UL 152 by the second UE time advance $TA_{UE.2}$ to cause the signals on the UL 152 from the aggressor UE 106 to be time aligned with the signals on the DL 150 from the BS 102 at the victim UE 104 when the BS 102 is operating in a sub-band full duplex (SBFD) mode of operation or a dynamic TDD mode of operation. The second UE time advance $TA_{UE.2}$ represents an advancement in the timing of the UL frame such that the UL 152 is aligned with the signals on the DL 150 from the BS 102 at the victim UE 104.

As described above, the BS 102 can operate in the static TDD mode of operation, the SBFD mode of operation or the dynamic TDD mode of operation and can, in some embodiments, switch among these modes of operation. In some embodiments, the static TDD mode of operation represents a half-duplex mode of operation whereby the BS 102 can either transmit signals on the DL 150 or receive signals on the UL 152 but not both simultaneously. In the static TDD mode of operation, the resources allocated between the DL 150 and the UL 152 by the BS 102 are fixed, or static, in the static TDD mode of operation. In some embodiments, the static TDD mode of operation can represent a legacy TDD mode of operation that is outlined in, for example, Rel-15, Rel-16, Rel-17, or others. In some embodiments, the SBFD mode of operation represents a full-duplex mode of operation whereby the BS 102 can simultaneously transmit signals on the DL 150 and receive signals on the UL 152. In these embodiments, the SBFD mode of operation closely approximates a frequency division duplex (FFD) mode of operation that can simultaneously transmit the signals on the DL 150 and receive the signals on the UL 152. In some embodiments, the dynamic TDD mode of operation represents another half-duplex mode of operation whereby the BS 102 can either transmit signals on the DL 150 or receive signals on the UL 152 but not simultaneously in a substantially similar manner as the static TDD mode of operation. However, in the dynamic TDD mode of operation, the BS 102 can flexibly adjust resources allocated between the DL 150 and the UL 152 in response to, for example, traffic conditions, within the wireless network 100.

Figures 2A, 2B:
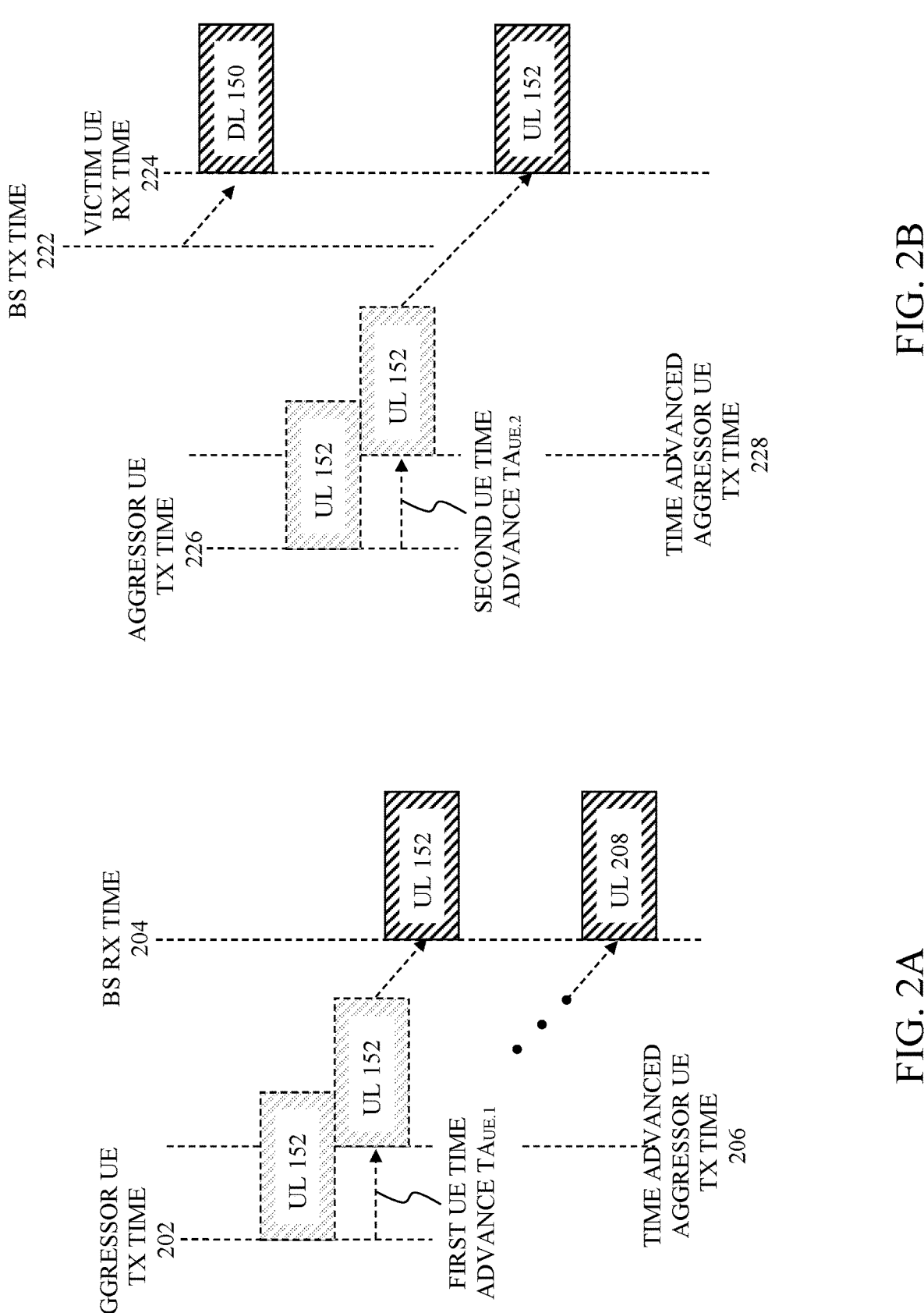
FIG. 2A and FIG. 2B graphically illustrate exemplary time advances that can be implemented within the exemplary wireless networks in accordance with various embodiments of the present disclosure.

FIG. 2A and FIG. 2B graphically illustrate exemplary time advances that can be implemented within the exemplary wireless networks in accordance with various embodiments of the present disclosure. The discussion of FIG. 2A and FIG. 2B to follow is to describe exemplary time advances within the wireless network 100 as described above in FIG. 1A. However, these exemplary time advances are equally applicable to the wireless network 120 as illustrated in FIG. 1B as will be recognized by those skilled in the relevant art(s) without departing from the spirit and scope of the present disclosure. As described above, the aggressor UE 106 can advance the signals on the UL 152 by the first UE time advance $TA_{UE.1}$ when the BS 102 is operating in the static TDD mode of operation or by the second UE time advance $TA_{UE.2}$ when the BS 102 is operating in the SBFD mode of operation or the dynamic TDD mode of operation. The discussion of FIG. 2A to follow is to further describe the first UE time advance $TA_{UE.1}$ that can be utilized by the aggressor UE 106 to time align the signals on the UL 152 with other signals from other UEs at the BS 102. And the discussion of FIG. 2B to follow is to further describe the second UE time advance $TA_{UE.2}$ that can be utilized by the aggressor UE 106 to time align the signals on the UL 152 with the signals on the DL 150 from the BS 102 at the victim UE 104.

In the exemplary embodiment illustrated in FIG. 2A, the aggressor UE 106 can transmit signals on the UL 152 to the BS 102 at the aggressor UE TX time 202 that are received by the BS 102 at a BS RX time 206. Although not illustrated in FIG. 2A, these signals on the UL 152 from the aggressor UE 106 would likely arrive at different times, namely, be misaligned in time, with respect to other signals from other UEs on ULs 208 at the BS 102 at the BS RX time 206 causing interference, for example, inter carrier interference (ICI), in the first wireless network 100. In some embodiments, the signals on the UL 152 and the other signals from the other UEs on the ULs 208 can include cyclic prefixes (CPs). In these embodiments, the time misalignment between the signals on the UL 152 and the other signals from the other UEs on the ULs 208 at the BS RX time 204 can cause these CPs to be misaligned with respect to each other at the BS RX time 204, which can cause the ICI in the first wireless network 100. For example, the signals on the UL 152 and the other signals from the other UEs on the ULs 208 can be orthogonal frequency-division multiplexing (OFDM) signals. In this example, the OFDM signals on the UL 152 and the other OFDM signals on the ULs 208 often cause the ICI at the BS 102 when these OFDM signals are not CP aligned with respect to each other at the BS RX time 204.

However, as illustrated in FIG. 2A, the aggressor UE 106 can advance the signals on the UL 152 by the first UE time advance $TA_{UE.1}$ when the BS 102 is operating in the static TDD mode of operation to cause the signals on the UL 152 to be time aligned with the other signals from the other UEs on the ULs 208 at the BS 102. In the exemplary embodiment illustrated in FIG. 2A, the aggressor UE 106 can advance the signals on the UL 152 from the aggressor UE TX time 202 by the first UE time advance $TA_{UE.1}$ to a time advanced aggressor UE TX time 206. In some embodiments, these signals on the UL 152 from the aggressor UE 106 would arrive at the substantially the same time, namely, be aligned in time, with respect to other signals from other UEs on the ULs 208 at the BS 102 at the BS RX time 206. In some embodiments, the signals on the UL 152 and the other signals from the other UEs on the ULs 208 can include cyclic prefixes (CPs). In these embodiments, the time alignment between the signals on the UL 152 and the other signals from the other UEs on the ULs 208 at the BS RX time 204 can cause these CPs to be aligned with respect to each other at the BS RX time 204 which does not cause the ICI in the first wireless network 100.

In the exemplary embodiment illustrated in FIG. 2B, BS 102 can transmit signals on the DL 150 to the victim UE 104 at a BS TX time 222 that are received by the victim UE 104 at a victim UE RX time 224. And as illustrated in FIG. 2B, the aggressor UE 106 can transmit signals on the UL 152 to the BS 102 at an aggressor UE TX time 226. Although not illustrated in FIG. 2B, the signals on the DL 150 and the signals on the UL 152 would likely arrive at different times, namely, be misaligned in time, at the victim UE 104 at a victim UE RX time 224 causing the CLI 154 in the first wireless network 100. In some embodiments, the signals on the DL 150 and the signals on the UL 152 can include the CPs. In these embodiments, the time misalignment between the signals on the DL 150 and the signals on the UL 152 at the victim UE 104 can cause these CPs to be misaligned with respect to each other at the victim UE RX time 224 which can cause the CLI 154 in the first wireless network 100. For example, the signals on the DL 150 and the signals on the UL 152 can be OFDM signals. In this example, the OFDM signals on the DL 150 and the OFDM signals on the UL 152 often cause the CLI 154 at the victim UE 104 when these OFDM signals are not CP aligned with respect to each other at the victim UE RX time 224.

However, as illustrated in FIG. 2B, the aggressor UE 106 can advance the signals on the UL 152 by the second UE time advance $TA_{UE.2}$ when the BS 102 is operating in the SBFD mode of operation or the dynamic TDD mode of operation to cause the signals on the UL 152 to be time aligned with the signals on the DL 150 at the victim UE 104.

In the exemplary embodiment illustrated in FIG. 2B, the aggressor UE 106 can advance the signals on the UL 152 from the aggressor UE TX time 226 by the second UE time advance $TA_{UE.2}$ to a time advanced aggressor UE TX time 228. In some embodiments, these signals on the UL 152 from the aggressor UE 106 would arrive at substantially the same time to be aligned in time with respect to the signals on the DL 150 at the victim UE 104 at the victim UE RX time 224. In some embodiments, the signals on the DL 150 and the signals on the UL 152 can include the CPs. In these embodiments, the time alignment between the signals on the DL 150 and the signals on the UL 152 at the victim UE RX time 224 can cause these CPs to be aligned with respect to each other at the victim UE RX time 224 which can mitigate the CLI 154 in the first wireless network 100.

Determining the Exemplary Time Advances within the Exemplary Wireless Networks

As described above, the aggressor UE 106 can utilize the first UE time advance $TA_{UE.1}$ when the BS 102 operating in the static TDD mode of operation or the second UE time advance $TA_{UE.2}$ when the BS 102 operating in the SBFD mode of operation or the dynamic TDD mode of operation. Generally, the first UE time advance $TA_{UE.1}$ that is to be utilized by the aggressor UE 106 when the BS 102 is operating in the static TDD mode of operation. In some embodiments, the first UE time advance $TA_{UE.1}$ can be denoted as:

$$T_{TA\_LTDD} = (N_{TA\_LTDD} + N_{TA,offset\_LDD})^* T_c, \tag{1}$$

where $T_{TA\_LTDD}$ represents the first UE time advance $TA_{UE.1}$ to be utilized by the aggressor UE 106 when the BS 102 is operating in the static mode of operation, $N_{TA\_LTDD}$ represents a timing that is measured by the BS 102 that can be provided to the aggressor UE 106 within a Timing Advance Command (TAC) from the BS 102, $N_{TA,offset\_LDD}$ represents an offset from the timing that can vary based upon to frequency band and subcarrier spacing, and $T_c$ represents a basic time unit, for example, 0.509 nanoseconds (ns).

Similarly, the second UE time advance $TA_{UE.2}$ that is to be utilized by the aggressor UE 106 when the BS 102 is operating in the SBFD mode of operation or the dynamic TDD mode of operation can be denoted as:

$$T_{TA_{SBFD/DTDD}} = (N_{TA\_SBFD/DTDD} + N_{TA,offset\_SBFD/DTDD})^* T_c, \tag{2}$$

where $T_{TA_{SBFD/DTDD}}$ represents the second UE time advance $TA_{UE.2}$ to be utilized by the aggressor UE 106 when the BS 102 is operating in the SBFD mode of operation or the dynamic TDD mode of operation, $N_{TA\_SBFD/DTDD}$ represents the timing that is measured by the BS 102 that can be provided to the aggressor UE 106 within the TAC from the BS 102, $N_{TA,offset\_SBFD/DTDD}$ represents an offset from the timing as to be described in further detail below, and $T_c$ represents the basic time unit.

Signaling of the Exemplary Time Advances within the Exemplary Wireless Networks

As described above, the aggressor UE 106 can utilize the first UE time advance $TA_{UE.1}$ when the BS 102 operating in the static TDD mode of operation or the second UE time advance $TA_{UE.2}$ when the BS 102 operating in the SBFD mode of operation or the dynamic TDD mode of operation. In some embodiments, the aggressor UE 106 can receive the first UE time advance $TA_{UE.1}$ and/or the second UE time advance $TA_{UE.2}$ from the BS 102 on Layer 1 signaling, such as Uplink Control Information (UCI) to provide an example, Layer 2 signaling, such as a Random Access Response (RAR) having Timing Alignment (TA) information and/or Media Access Control-Control Element (MAC-CE) to provide some examples, and/or higher layer signaling, such as Radio Resource Control (RRC) messaging to provide an example.

In some embodiments, the BS 102 and the aggressor UE 106 can undergo a handshaking procedure to provide the first UE time advance $TA_{UE.1}$ to the aggressor UE 106. In these embodiments, the handshaking procedure can represent an initial UL synchronization procedure between the BS 102 and the aggressor UE 106. The initial UL synchronization procedure can be achieved through a random-access process where the BS 102 provides a Timing Advance Command (TAC) to the aggressor UE 106 inside a Random-Access Response (RAR). In some embodiments, the RAR can include the first UE time advance $TA_{UE.1}$, for example, the timing $N_{TA\_LTDD}$ as described above. In these embodiments, the timing $N_{TA\_LTDD}$ for the RAR can be denoted as $N_{TA}=T_A*16.64/2^\mu$ with index values of TA being indicated by the RAR. Alternatively, or in addition to, in these embodiments, the handshaking procedure can represent another procedure, for example, once the UL synchronization is complete, between the BS 102 and the aggressor UE 106. As part of this other procedure, the BS 102 can transmit, for example, on Layer 2 signaling, the TAC to the aggressor UE 106 to request the aggressor UE 106 to adjust the first UE time advance $TA_{UE.1}$, for example, the timing $N_{TA\_LTDD}$ as described above. In these embodiments, the aggressor UE 106 can adjust the timing $N_{TA\_LTDD}$ in accordance with $N_{TAnew}=N_{TAold}+(T_A-31)*16.64/24$ with index values of TA being indicated by Layer 2 signaling. In some embodiments, the Layer 2 signaling can indicate a TAG Identity (TAG ID) that indicates a Timing Advance Group Identity for the aggressor UE 106 and the TAC that indicates the index values of TA to control the amount of timing advancement to be applied by the aggressor UE 106.

In some embodiments, the BS 102 and the aggressor UE 106 can undergo a handshaking procedure to provide the second UE time advance $TA_{UE.2}$ to the aggressor UE 106. In these embodiments, the aggressor UE 106 can receive the second UE time advance $TA_{UE.2}$ from the BS 102 on Layer 1 signaling, such as Uplink Control Information (UCI) to provide an example, Layer 2 signaling, such as a Random Access Response (RAR) having TA (Timing Alignment) information and/or Media Access Control-Control Element (MAC-CE) to provide some examples, and/or higher layer signaling, such as Radio Resource Control (RRC) messaging to provide an example. In these embodiments, the BS 102 can provide the second UE time advance $TA_{UE.2}$ to the aggressor UE 106 in a substantially similar manner as the first UE time advance $TA_{UE.1}$ as described above.

Alternatively, or in addition to, the BS 102, the victim UE 104, and the aggressor UE 106 can undergo a handshaking procedure to provide the second UE time advance $TA_{UE.2}$ to the aggressor UE 106 when the BS 102 operating in the SBFD mode of operation or the dynamic TDD mode of operation. In some embodiments, the victim UE 104 can determine the second UE time advance $TA_{UE.2}$, for example, the $T_{TA_{SBFD/DTDD}}$ as described above, to be utilized by the aggressor UE 106 to time align the signals on the UL 152 from the aggressor UE 106 with the signals on the DL 150 from the BS 102 at the victim UE 104. In some embodiments, the victim UE 104 can provide the second UE time advance $TA_{UE.2}$ to the BS 102 as on Layer 1 signaling, such as UCI. In some embodiments, the UCI can include a new bit-field, for example, a new time advance bit-field that is not outlined by the 3GPP standards, to indicate the second UE time advance $TA_{UE.2}$.

In some embodiments, the BS 102 can provide DCI to the victim UE 104 to indicate which Hybrid Automatic Repeat Request (HARQ) process is to be used by the victim UE 104 in recovering and/or decoding user data on the PDSCH. In these embodiments, the DCI can include a New Data Indicator (NDI) bit to indicate whether the user data on the PDSCH is new user data or a re-transmission of previous user data. In some embodiments, upon scheduling the PDSCH, the victim UE 104 can check the NDI bit to determine whether the user data on the PDSCH is the new user data or the re-transmission of previous user data. In these embodiments, the victim UE 104 can calculate a checksum of the user data on the PDSCH and can report a HARQ report indicating an acknowledgement (ACK) or no acknowledgement (NACK) of the user data on the PDSCH. In these embodiments, the victim UE 104 can annex, or encode, the second UE time advance $TA_{UE.2}$ within the Hybrid Automatic Repeat Request-Acknowledgement (HARQ-ACK) for the PDSCH and can provide the second UE time advance $TA_{UE.2}$ to the BS 102 over the same PUCCH indicated by DCI for the HARQ-ACK. Alternatively, or in addition to, the victim UE 104 can provide the second UE time advance $TA_{UE.2}$ to the BS 102 over a separate PUCCH and/or a separate PUSCH other than the PUCCH and/or the PUSCH, respectively, indicated by the DCI for HARQ-ACK. Alternatively, or in addition to, the victim UE 104 can provide the second UE time advance $TA_{UE.2}$ to the BS 102 on the PUSCH as indicated by Layer 2 signaling, such as a MAC-CE, for example.

Figure 3A:
FIG. 3A illustrates a flowchart of a first exemplary operation for managing CLI interference within the exemplary wireless networks in accordance with various embodiments of the present disclosure.
Figure 3A:
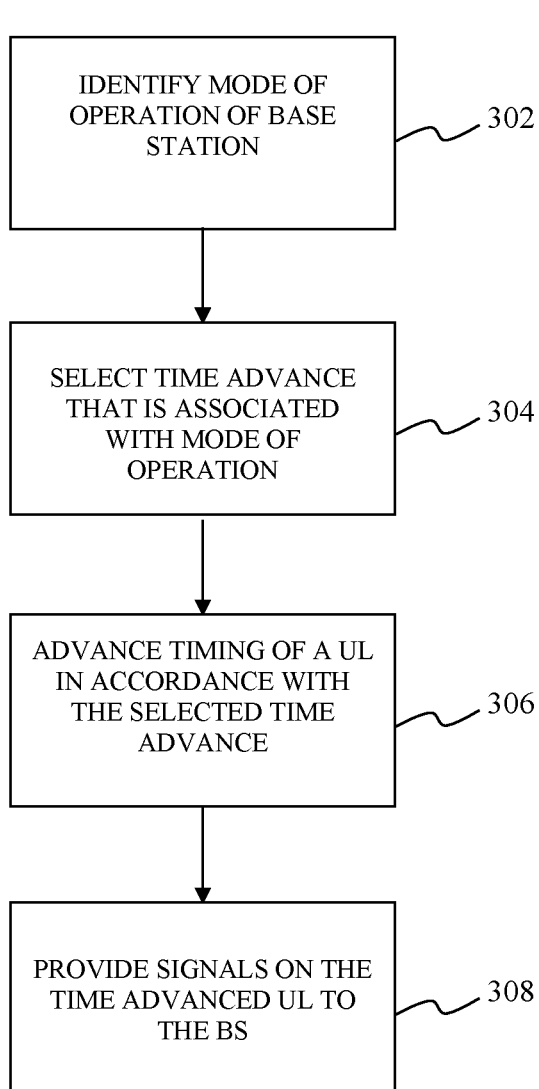

Exemplary Timing Advance Technique to Manage Cross Link Interference in 5G Communication Systems FIG. 3A illustrates a flowchart of a first exemplary operation for managing CLI interference within the exemplary wireless networks in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for managing CLI interference within the exemplary wireless networks as described above in FIG. 1A, FIG. 1B, FIG. 2A, and/or FIG. 2B. The operational control flow 300 can be executed by an electronic device, such as the aggressor UE 104 as illustrated in FIG. 1A.

At operation 302, the operational control flow 300 can identify a mode of operation of a base station (BS), such as the BS 102 to provide an example, within the exemplary wireless networks. In some embodiments, the BS can operate in the static TDD mode of operation, the SBFD mode of operation or the dynamic TDD mode of operation and can, in some embodiments, switch among these modes of operation in a substantially similar manner as described above. In these embodiments, the BS can provide the mode of operation of the BS to the operational control flow 300 on Layer 1 signaling, such as DCI to provide an example, Layer 2 signaling, such as a Media Access Control-Control Element (MAC-CE) to provide an example, and/or higher layer signaling, such as Radio Resource Control (RRC) messaging to provide an example.

At operation 304, the operational control flow 300 can select a time advance, such as the first UE time advance $TA_{UE.1}$ or the second UE time advance $TA_{UE.2}$, that is associated with the mode of operation from operation 302. In some embodiments, the first UE time advance $TA_{UE.1}$ can be associated with the static TDD mode of operation and the second UE time advance $TA_{UE.2}$ can be associated with the SBFD mode of operation or the dynamic TDD mode of operation. In some embodiments, the operational control flow 300 can select the first UE time advance $TA_{UE.1}$ when the mode of operation of the BS identified in operation 302 is the static TDD mode of operation or the second UE time advance $TA_{UE.2}$ when the mode of operation of the BS identified in operation 302 is the SBFD mode of operation or the dynamic TDD mode of operation. In some embodiments, the BS can provide the first UE time advance $TA_{UE.1}$ or the second UE time advance $TA_{UE.2}$ to the operational control flow 300 on Layer 1 signaling, such as UCI to provide an example, Layer 2 signaling, such as a Media Access Control-Control Element (MAC-CE) to provide an example, and/or higher layer signaling, such as Radio Resource Control (RRC) messaging to provide an example, in a substantially similar manner as described above.

At operation 306, the operational control flow 300 can advance timing of a UL, such as the UL 152 to provide an example, in accordance with the selected time advance from operation 304. In some embodiments, the operational control flow 300 can advance a timing of an UL frame structure by the first UE time advance $TA_{UE.1}$ from operation 304 to cause signals on the UL to be time aligned with other signals from other UEs at the BS to mitigate inter carrier interference (ICI) at the BS in a substantially similar manner as described above. In some embodiments, the operational control flow 300 can adjust a timing of an UL frame structure by the second UE time advance $TA_{UE.1}$ from operation 304 to cause signals on the UL to be time aligned with signals on the DL from the BS at another electronic device, such as the victim UE 104 to provide an example, in a substantially similar manner as described above.

At operation 308, the operational control flow 300 can transmit signals on the time advanced UL from operation 306 to the BS.

Figure 3B:
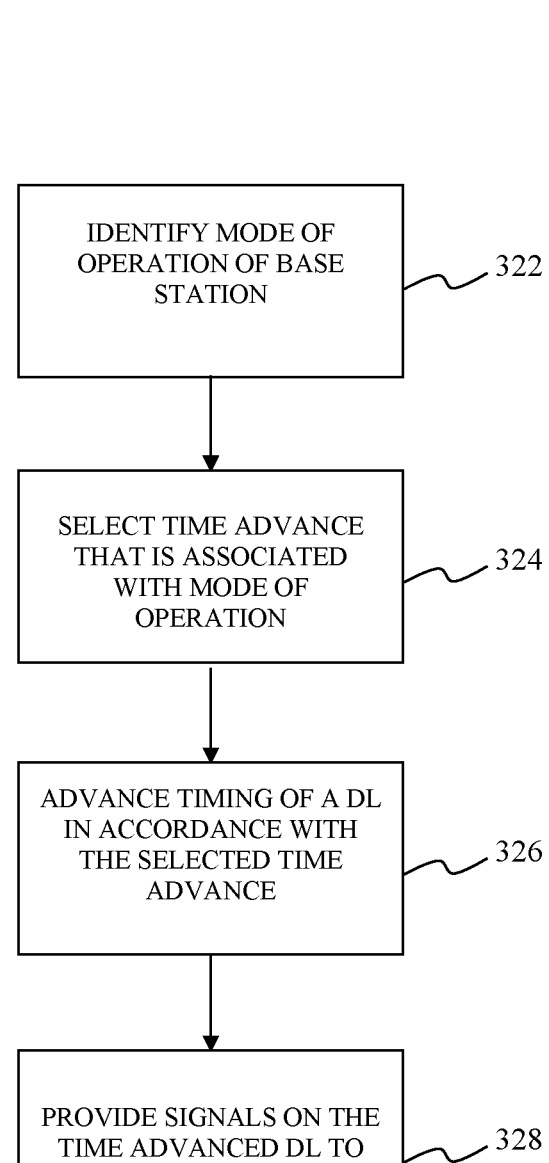
FIG. 3B illustrates a flowchart of a second exemplary operation for managing CLI interference within the exemplary wireless networks in accordance with various embodiments of the present disclosure.

FIG. 3B illustrates a flowchart of a second exemplary operation for managing CLI interference within the exemplary wireless networks in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 320 for managing CLI interference within the exemplary wireless networks as described above in FIG. 1A, FIG. 1B, FIG. 2A, and/or FIG. 2B. The operational control flow 320 can be executed by an electronic device, such as the aggressor BS 122 as illustrated in FIG. 1B.

At operation 322, the operational control flow 320 can identify a mode of operation of a base station (BS), such as the aggressor BS 122 to provide an example, within the exemplary wireless networks. In some embodiments, the BS can operate in the static TDD mode of operation, the SBFD mode of operation or the dynamic TDD mode of operation and can, in some embodiments, switch among these modes of operation in a substantially similar manner as described above. In these embodiments, the BS can provide the mode of operation of the BS to the operational control flow 320 on Layer 1 signaling, such as DCI to provide an example, Layer 2 signaling, such as a Media Access Control-Control Element (MAC-CE) to provide an example, and/or higher layer signaling, such as Radio Resource Control (RRC) messaging to provide an example.

At operation 324, the operational control flow 320 can select a time advance, such as the first BS time advance $TA_{BS.1}$ or the second BS time advance $TA_{BS.2}$, that is associated with the mode of operation from operation 322. In some embodiments, the first BS time advance $TA_{BS.1}$ can be associated with the static TDD mode of operation and the second BS time advance $TA_{BS.2}$ can be associated with the SBFD mode of operation or the dynamic TDD mode of operation. In some embodiments, the operational control flow 320 can select the first BS time advance $TA_{BS.1}$ when the mode of operation of the BS identified in operation 322 is the static TDD mode of operation or the second BS time advance $TA_{BS.2}$ when the mode of operation of the BS identified in operation 322 is the SBFD mode of operation or the dynamic TDD mode of operation. In some embodiments, the BS can provide the first BS time advance $TA_{BS.1}$ or the second BS time advance $TA_{BS.2}$ to the operational control flow 320 on Layer 1 signaling, such as UCI to provide an example, Layer 2 signaling, such as a Media Access Control-Control Element (MAC-CE) to provide an example, and/or higher layer signaling, such as Radio Resource Control (RRC) messaging to provide an example, in a substantially similar manner as described above.

At operation 326, the operational control flow 320 can advance timing of a DL, such as the DL 170 to provide an example, in accordance with the selected time advance from operation 324. In some embodiments, the operational control flow 320 can advance a timing of a DL frame structure by the first BS time advance $TA_{BS.1}$ from operation 324 to cause signals on the DL to be time aligned with other signals from other BSs at a first UE, such as the first UE 124 to provide an example, to mitigate inter carrier interference (ICI) in a substantially similar manner as described above. In some embodiments, the operational control flow 320 can adjust a timing of an DL frame structure by the second BS time advance $TA_{BS.1}$ from operation 324 to cause signals on the DL to be time aligned with signals on a UL from a second UE, such signals on the UL 172 from the second UE 128 to provide an example, at another electronic device, such as the victim BS 104 to provide an example, in a substantially similar manner as described above.

At operation 328, the operational control flow 320 can transmit signals on the time advanced DL from operation 326 to the first UE.

Figure 4:
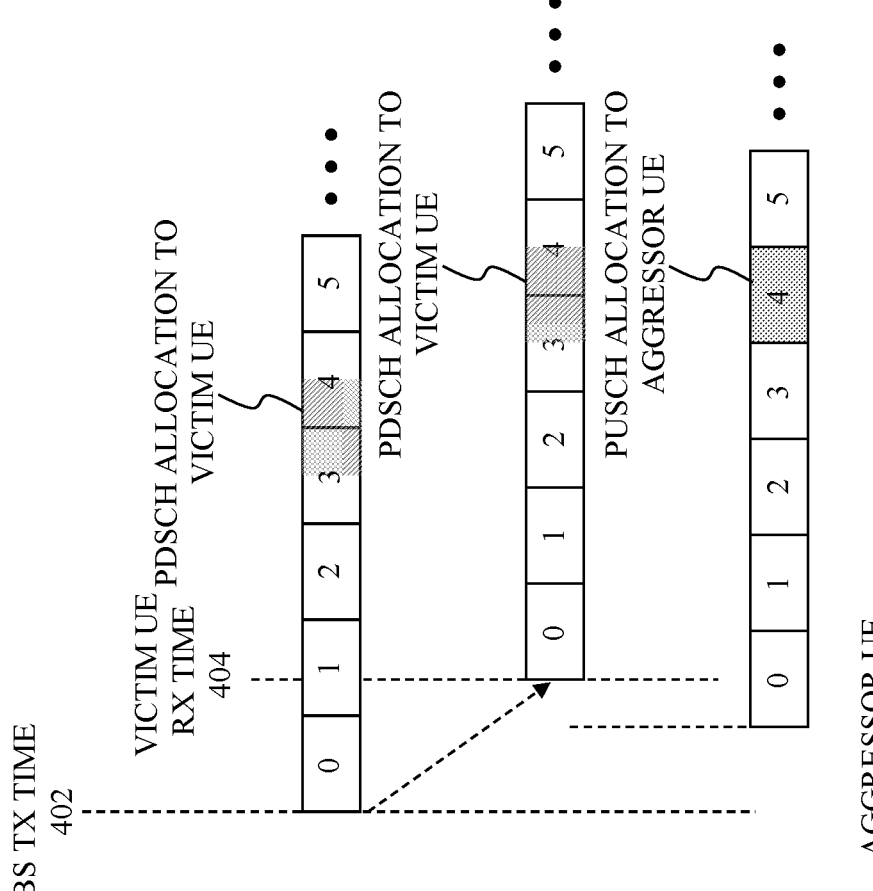
FIG. 4 graphically illustrates exemplary resource scheduling that can be implemented within the exemplary wireless networks in accordance with various embodiments of the present disclosure.

Exemplary Resource Scheduling that can be Implemented in the Exemplary Wireless Networks to Mitigate CLI The exemplary time advances that can be utilized to mitigate the CLI within the wireless network 100 and/or the wireless network 120 have been described above. Alternatively, or in addition to, the wireless network 100 and/or the wireless network 120 can schedule the PDSCH and/or the PUSCH to mitigate the CLI within these wireless networks. FIG. 4 graphically illustrates exemplary resource scheduling that can be implemented within the exemplary wireless networks in accordance with various embodiments of the present disclosure. The discussion of FIG. 4 to follow is to describe exemplary resource scheduling within the wireless network 100 as described above in FIG. 1A. However, this exemplary resource scheduling is equally applicable to the wireless network 120 as illustrated in FIG. 1B as will be recognized by those skilled in the relevant art(s) without departing from the spirit and scope of the present disclosure.

As illustrated in FIG. 4, the BS 102 can transmit signals over the PDSCH on the DL 150 that are received by the victim UE 104 at a victim UE RX time 404. In some embodiments, the PDSCH can be separable into multiple slots. In these embodiments, the BS 102 can allocate resources that cross the border between slots from among these multiple slots to transmit the signals on the DL 150 to the victim UE 104. For example, as illustrated in FIG. 4, the BS 102 can allocate some of slot three and some of slot four as highlighted by the gray shading to transmit the signals on the DL 150 to the victim UE 104. And as illustrated in FIG. 4, the aggressor UE 106 can transmit signals over the PUSCH on the UL 152 at an aggressor UE TX time 406 that are received by the victim UE 104 at the victim UE RX time 404. In some embodiments, the BS 102 can allocate resources in the PUSCH to the aggressor UE 106 that are aligned in time with the resources in the PDSCH that are allocated to the victim UE 104. For example, as illustrated in FIG. 4, the BS 102 can allocate slot four as highlighted by the gray shading to the aggressor UE 106 that is aligned in time with the PDSCH that are allocated to the victim UE 104, namely, some of slot three and some of slot four. As a result, the signals over the PDSCH on the DL 150 from the BS 102 and the signals over the PUSCH on the UL 152 from the aggressor UE 106 are aligned in time at the victim UE 104 at the victim UE RX time 404.

Figure 5:
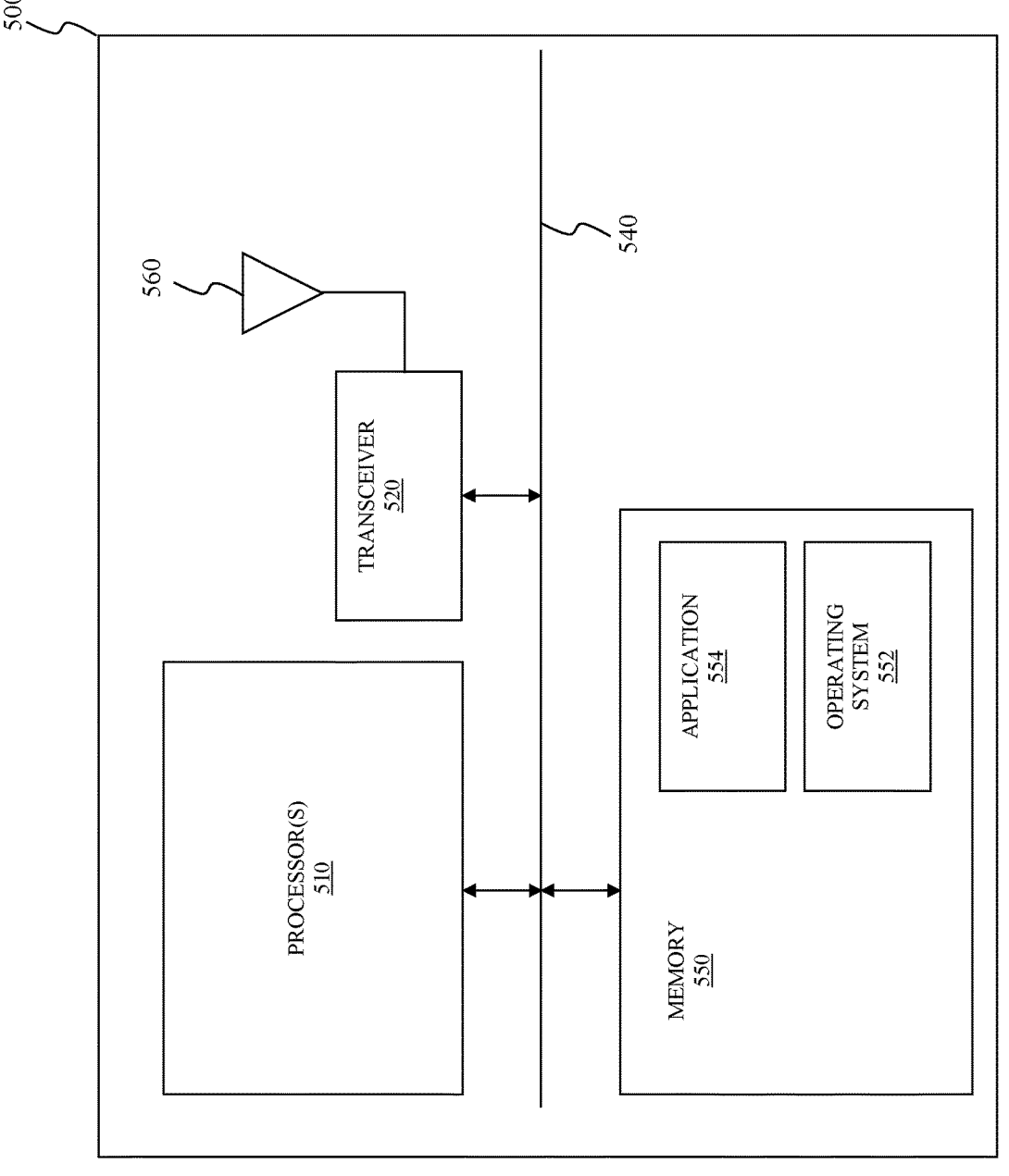
FIG. 5 illustrates a block diagram of an electronic device for mitigating the CLI within the exemplary wireless networks in accordance with various embodiments of the present disclosure.

Exemplary Electronic Device that can be Implemented within the Exemplary Wireless Networks FIG. 5 illustrates a block diagram of an electronic device for mitigating the CLI within the exemplary wireless networks in accordance with various embodiments of the present disclosure. In the exemplary embodiment illustrated in FIG. 5, an electronic device 500 may be any of the electronic devices, for example, the victim UE 104 and/or the aggressor UE 104 as illustrated in FIG. 1A and/or the aggressor BS 122 and/or the victim BS 125 as illustrated in FIG. 1B. As illustrated in FIG. 5, the electronic device includes one or more processors 510, one or more transceivers 520, a communication infrastructure 540, a memory 550, an operating system 552, an application 554, and an antenna 560. The various systems illustrated in FIG. 5 are provided as exemplary parts of the electronic device 500, and the electronic device 500 can include other circuit(s) and subsystem(s). Also, although the systems of the electronic device 500 are illustrated as separate components, the aspects of this disclosure can include any combination of these, less, or more components. Also, the electronic device 500 can include any number of processors, transceivers, communication infrastructures, memories, operating systems, applications, and antennas.

The memory 550 may include random access memory (RAM) and/or cache, and may include control logic (e.g., computer software) and/or data. The memory 550 may include other storage devices or memory such as, but not limited to, a hard disk drive and/or a removable storage device/unit. According to some examples, the operating system 552 can be stored in the memory 550. The operating system 552 can manage transfer of data between the memory 550, the application 554, the processor 510, and/or the transceiver 520. In some examples, the operating system 552 maintains one or more network protocol stacks (e.g., Internet protocol stack, cellular protocol stack, and the like) that can include a number of logical layers. At corresponding layers of the protocol stack, the operating system 552 includes control mechanism and data structures to perform the functions associated with that layer. In some embodiments, the application 554 can be stored in the memory 550. The application 554 can include applications (e.g., user applications) used by a wireless electronic device and/or a user of the wireless electronic device. The application 554 can include applications such as, but not limited to, radio streaming, video streaming, remote control, and/or other user applications.

The electronic device 500 can also include the communication infrastructure 540. The communication infrastructure 540 provides communication between, for example, the processor 510, the transceiver 520, and the memory 550. In some implementations, the communication infrastructure 540 may be a bus. The processor 510 together with instructions stored in memory 550 can performs operations enabling the electronic device 500 to mitigate the CLI within the exemplary wireless networks as described above in FIG. 1A, FIG. 1B, FIG. 2A, FIG. 2B, FIG. 3A, FIG. 3B, and/or FIG. 4.

The transceiver 520 can transmit and receive communications signals that support the operations of electronic device including, but not limited to, mitigation for transmitting latency, according to some aspects, and may be coupled to the antenna 560. The antenna 560 may include one or more antennas that may be the same or different types. The transceiver 520 allows the electronic device 500 to communicate with other devices that may be wired and/or wireless. In some examples, the transceiver 520 can include processors, controllers, radios, sockets, plugs, buffers, and like circuits/devices used for connecting to and communication on networks. According to some examples, the transceiver 520 include one or more circuits to connect to and communicate on wired and/or wireless networks. In some embodiments, the transceiver 520 can include a cellular subsystem, a WLAN subsystem, and/or a Bluetooth™ subsystem, each including its own radio transceiver and protocol(s) as will be understood by those skilled arts based on the discussion provided herein. In some implementations, the transceiver 520 can include more or fewer systems for communicating with other devices. In some embodiments, the transceiver 520 can include one or more circuits (including a WLAN transceiver) to enable connection(s) and communication over WLAN networks such as, but not limited to, networks based on standards described in IEEE 802.11. Additionally, or alternatively, the transceiver 520 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 520$n$ can include a Bluetooth™ transceiver. In some embodiments, the transceiver 520 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the transceiver 520$a$-550$n$ can be configured to operate according to one or more of Rel-15, Rel-15, Rel-17, or other of the 3GPP standards.

In some embodiments, the processor 510, alone or in combination with computer instructions stored within the memory 550, and/or the transceiver 520 can mitigate the CLI within the exemplary wireless networks as described above in FIG. 1A, FIG. 1B, FIG. 2A, FIG. 2B, FIG. 3A, FIG. 3B, and/or FIG. 4.

Figure 6:
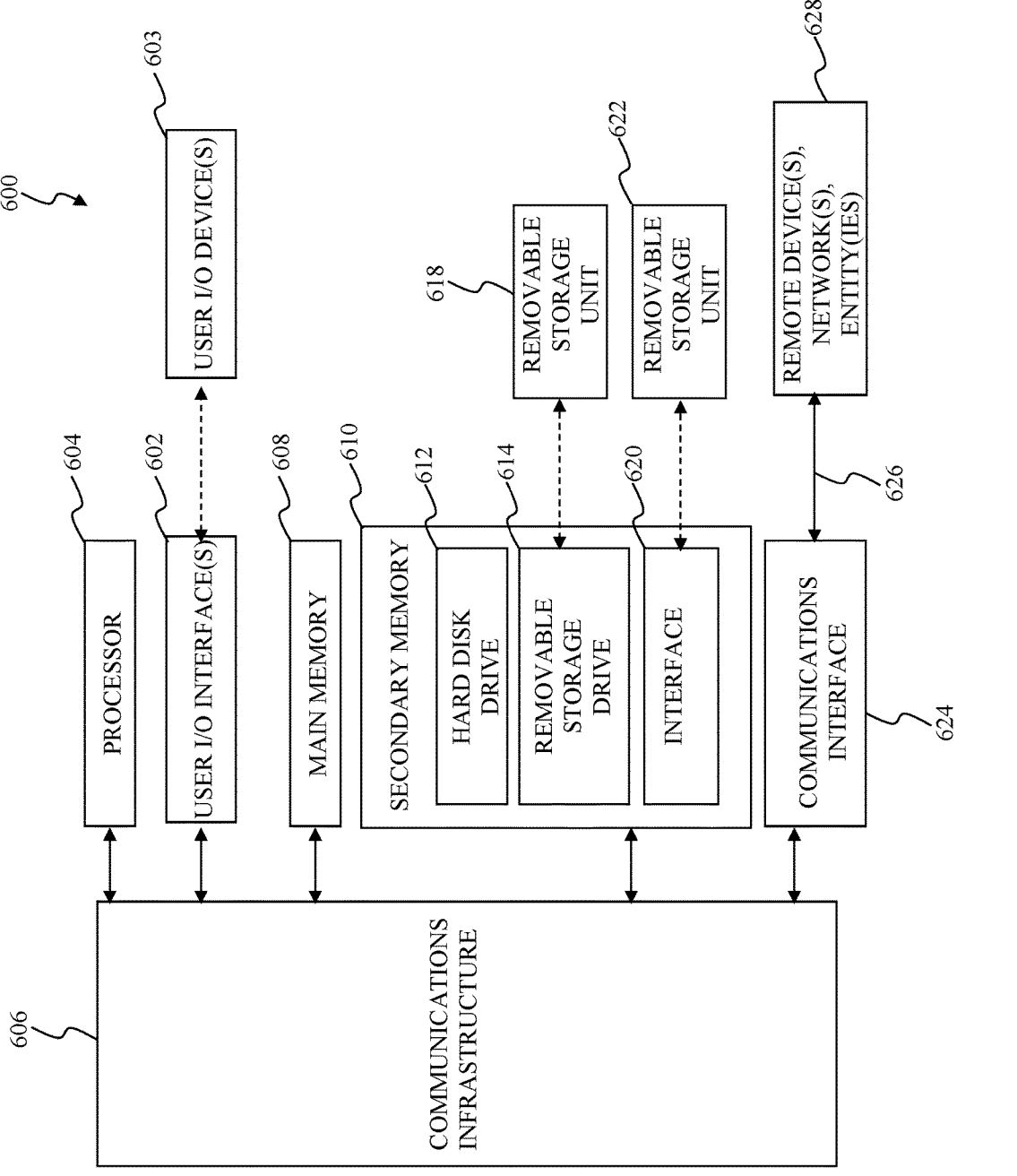
FIG. 6 illustrates a block diagram of an exemplary computer system that can be implemented within the exemplary wireless networks according to some exemplary embodiments of the present disclosure.

Exemplary Computer System that can be Implemented within the Exemplary Wireless Networks FIG. 6 illustrates a block diagram of an exemplary computer system that can be implemented within the exemplary wireless networks according to some exemplary embodiments of the present disclosure. Computer system 600 can be any well-known computer capable of performing the functions described herein such as the victim UE 104 and/or the aggressor UE 104 as illustrated in FIG. 1A and/or the aggressor BS 122 and/or the victim BS 126 as illustrated in FIG. 1B. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as performing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan considering the teachings and guidance.

The breadth and scope of the disclosure should not be limited by any of the above-described exemplary embodiments but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for mitigating cross link interference (CLI) in a wireless network, the method comprising:
identifying, by a first user equipment (UE) within the wireless network, whether a base station (BS) within the wireless network is operating in a mode of operation selected from a group consisting of a static time division duplex (TDD) mode of operation, a sub-band full duplex (SBFD) mode of operation, or a dynamic TDD mode of operation;
selecting, by the first UE, a time advance (TA) that is associated with the identified mode of operation from among a plurality of TAs that are stored in the first UE, each of the plurality of TAs corresponding to one of the static TDD mode of operation, the SBFD mode of operation, or the dynamic TDD mode of operation;
advancing, by the first UE, timing of an uplink (UL) by the selected TA; and
transmitting, by the first UE, signals on the time advanced UL to the BS.

2. The method of claim 1, wherein the selecting comprises selecting the TA that is associated with the static TDD mode of operation; and
wherein the advancing comprises advancing timing of the UL by the first TA to cause the signals on the time advanced UL to be time aligned with other signals from other UEs received at the BS.

3. The method of claim 1, wherein the selecting comprises selecting the TA that is associated with the SBFD mode of operation or the dynamic TDD mode of operation, and
wherein the advancing comprises advancing timing of the UL by the TA to cause the signals on the time advanced UL to be time aligned with signals on a downlink (DL) from the BS at a second UE within the wireless network.

4. The method of claim 1, wherein the advancing comprises advancing timing of an UL frame by the selected TA.

5. The method of claim 1, further comprising receiving, by the first UE, the plurality of TAs from the BS on Layer 1 signaling.

6. The method of claim 5, wherein the Layer 1 signaling comprises Uplink Control Information (UCI).

7. The method of claim 1, further comprising receiving, by the first UE, the plurality of TAs from the BS on Layer 2 signaling.

8. The method of claim 7, wherein the Layer 2 signaling comprises a Random Access Response (RAR) having TA information or a Media Access Control-Control Element (MAC-CE).

9. A first user equipment (UE), comprising:
a processor configured to:
identify whether a base station (BS) within a wireless network is operating in a mode of operation selected from a group consisting of a static time division duplex (TDD) mode of operation, a sub-band full duplex (SBFD) mode of operation, or a dynamic TDD mode of operation,
select a time advance (TA) that is associated with the mode of operation from among a plurality of TAs that are stored in the first UE, each of the plurality of TAs corresponding to one of the static TDD mode of operation, the SBFD mode of operation, or the dynamic TDD mode of operation, and
advance timing of an uplink (UL) by the selected TA; and
a transceiver, coupled to the processor, configured to transmit signals on the time advanced UL to the BS.

10. The first UE of claim 9, wherein the processor is configured to:
select the TA that is associated with the static TDD mode of operation; and
advance timing of the UL by the TA to cause the signals on the time advanced UL to be time aligned with other signals from other UEs received at the BS.

11. The first UE of claim 9, wherein the processor is configured to:
select the TA that is associated with the SBFD mode of operation or the dynamic TDD mode of operation; and
advance timing of the UL by the TA to cause the signals on the time advanced UL to be time aligned with signals on a downlink (DL) from the BS at a second UE within the wireless network.

12. The first UE of claim 9, wherein the processor is configured to advance timing of an UL frame by the selected TA.

13. The first UE of claim 9, wherein the transceiver is further configured to receive the plurality of TAs from the BS on Layer 1 signaling.

14. The first UE of claim 13, wherein the Layer 1 signaling comprises Uplink Control Information (UCI).

15. The first UE of claim 9, wherein the transceiver is further configured to receive the plurality of TAs from the BS on Layer 2 signaling.

16. The first UE of claim 15, wherein the Layer 2 signaling comprises a Random Access Response (RAR) having TA information or a Media Access Control-Control Element (MAC-CE).

17. A first user equipment (UE), comprising:

a memory that stores a plurality of time advances (TAs), each of the plurality of TAs corresponding to one of a static time division duplex (TDD) mode of operation, a sub-band full duplex (SBFD) mode of operation, or a dynamic TDD mode of operation; and a processor configured to:

select a TA that is associated with a mode of operation of a base station (BS) within a wireless network, the mode of operation being selected from a group consisting of the static TTD mode of operation, the SBFD mode of operation, or the dynamic TDD mode of operation, advance timing of an uplink (UL) by the selected TA, and transmit signals on the time advanced UL to the BS.

18. The first UE of claim 17, wherein the processor is configured to:

select the TA that is associated with the static TDD mode of operation; and advance timing of the UL by the TA to cause the signals on the time advanced UL to be time aligned with other signals from other UEs received at the BS.

19. The first UE of claim 17, wherein the processor is configured to:

select the TA that is associated with the SBFD mode of operation or the dynamic TDD mode of operation; and advance timing of the UL by the TA to cause the signals on the time advanced UL to be time aligned with signals on a downlink (DL) from the BS at a second UE within the wireless network.

20. The first UE of claim 17, wherein the processor is configured to:

receive the plurality of TAs from the BS on Layer 1 or Layer 2 signaling; and store the received plurality of TAs in the memory.

* * * * *